May 31, 1932.   H. GILES   1,861,212
VENDING MACHINE
Filed Aug. 30, 1929   12 Sheets-Sheet 1

INVENTOR
HARVEY GILES
BY Julius H. Hutz
ATTORNEY

May 31, 1932.  H. GILES  1,861,212
VENDING MACHINE
Filed Aug. 30, 1929   12 Sheets-Sheet 2

Fig. 3.

INVENTOR
HARVEY GILES
BY
ATTORNEY

May 31, 1932. H. GILES 1,861,212
VENDING MACHINE
Filed Aug. 30, 1929 12 Sheets-Sheet 3

Fig. 4.

INVENTOR
HARVEY GILES
BY
*Julius H Ruth*
ATTORNEY

May 31, 1932. H. GILES 1,861,212
VENDING MACHINE
Filed Aug. 30, 1929 12 Sheets-Sheet 5

INVENTOR
*HARVEY GILES*
BY
ATTORNEY

May 31, 1932.  H. GILES  1,861,212
VENDING MACHINE
Filed Aug. 30, 1929   12 Sheets-Sheet 8

INVENTOR
HARVEY GILES
BY
ATTORNEY

May 31, 1932.    H. GILES    1,861,212
VENDING MACHINE
Filed Aug. 30, 1929    12 Sheets-Sheet 10

INVENTOR
HARVEY GILES
BY
ATTORNEY

Patented May 31, 1932

1,861,212

UNITED STATES PATENT OFFICE

HARVEY GILES, OF BROOKLYN, NEW YORK, ASSIGNOR TO ARTEMAS WARD INC., A CORPORATION OF DELAWARE

VENDING MACHINE

Application filed August 30, 1929. Serial No. 389,357.

The invention relates to an improvement in vending machines of the type in which the manipulation of a plunger or handle serves to deliver an article when a coin of proper denomination is deposited in the machine.

The general object of the invention is to produce a more simple, efficient and durable vending machine of the above-indicated type by reorganizing and simplifying the construction and mode of operation thereof. A more specific object of the invention is to provide an improved coin-controlled mechanism of such arrangement that the manipulation of a single plunger serves to operate one or more of a plurality of delivery devices. In accordance with this object one feature of the invention is the spaced arrangement of two separate supplies of the articles to be vended, each supply of articles having a separate article delivery device, and the location between the two article delivery devices of a coin-controlled mechanism having a single plunger or handle and means controlled thereby for actuating one or both of the article delivery devices by a single manipulation of the plunger according to whether one or two properly positioned coins are in the machine at one time. A further object of the invention is the provision of improved means for ejecting a spurious coin from the machine, and of means for returning a proper coin when the machine is not in condition to deliver an article. Another object of the invention is the provision of means whereby articles of different sizes and shapes may be accommodated and delivered by the same machine. Other objects of the invention will appear as the description proceeds. To the accomplishment of these objects, the invention consists in the improved coin-controlled vending machine hereinafter fully described and particularly pointed out in the appended claims.

In the accompanying drawings illustrating the preferred form of the invention, Fig. 17 is a view similar to Fig. 7, but showing the parts locked on the delivery of all the articles.

Figures 21, 22, 23, 24:
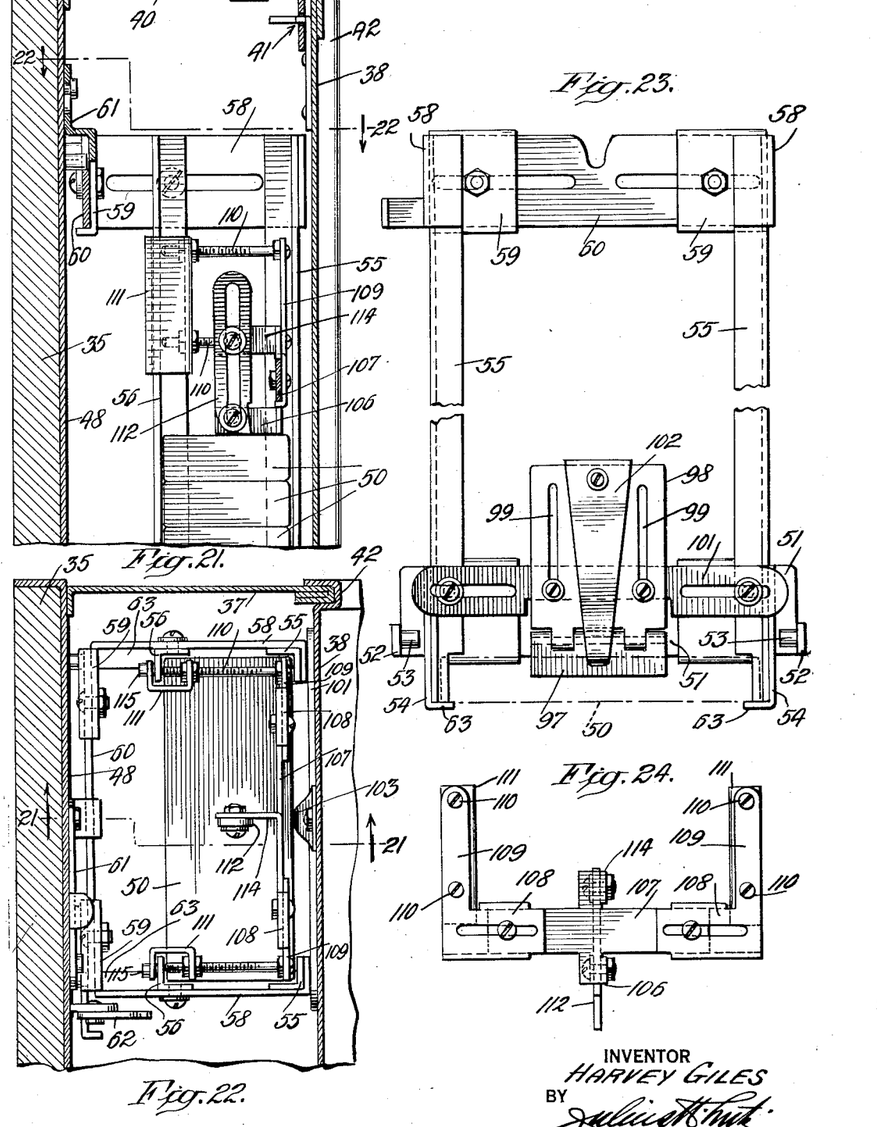
Fig. 21 is a vertical section taken on the line 21—21 of Fig. 22.
Fig. 22 is a transverse section taken on the line 22—22 of Fig. 21.
Fig. 23 is a front elevation of one of the article containing hoppers, with the middle sections of the uprights broken away.
Fig. 24 is a front elevation of the article follower.

The articles to be vended, the article delivery means, and the coin-controlled mechanism for actuating the article delivery means are all housed within an upright, box-like casing 25 of conventional design consisting of a back 35, two side walls 36 and 37, a removable front 38, a bottom 39 (Fig. 4), and a top 40 (Fig. 21). The top of the front wall 38 and the top 40 are provided with a suitable lock 41. The front of the casing extends forwardly at its lower part 43 and is provided around its edge with a bead 42.

Each article delivery means is separately operable and is associated with an upright hopper containing a pile of the articles to be vended. There may be any preferred number of separate article delivery means arranged to be operated by one or more handles. In the machine illustrated there are two article delivery means spaced apart and a coin-controlled mechanism located between them for operating them either separately or both together. Each article delivery means is provided with a separate coin slot, the one located in the right hand side of the machine with the slot 26, and the one located in the left hand side of the machine with the slot 27; the former discharges its articles into the receptacle 28 located in the bottom of front side of the casing and the latter discharges its articles into the receptacle 29, the front of each receptacle being provided with the guard piece 30. Both article delivery means are operated by the single handle 31. Returned coins are delivered into the box 33 on the front of the casing and over which is located a hood 34.

Both articles delivery means are constructed alike and have the same mode of operation. Accordingly it is only necessary to describe in detail the article delivery means and its associated parts located in the right hand side of the machine. This article delivery means comprises a frame consisting of the two end walls 44 and 45 substantially as wide as the lower part of the casing is deep and held spaced apart by the rods 46. The rear edges of the walls 44 and 45 are provided with the hooks 47 which pass through holes in the plate 48 lining the inner surface of the rear wall 35 of the casing, and so hold the frames in place in the lower part of the casing. On the upper edges of the rear part of each frame is supported the lower end of a vertically arranged hopper for containing a pile of the articles 50 to be vended. The hopper supporting means consists of a rear transversely arranged plate 51 having at its ends the forwardly turned ears 52 provided with the pins 53 arranged to rest in notches in the upper edges of the walls 44 and 45. Adjustabily secured to the transverse plate 51 are the inturned rear ends of two side plates 54 to the front ends of which are secured the lower ends of the two front uprights 55 of the hopper. The rear ends of the side plates 54 are slotted and to these ends of the side plates are adjustably secured the rear uprights 56 of the hopper. In like manner the upper ends of the front uprights 55 are fixed to the front ends of the upper side plates 58 whereas the upper ends of the rear uprights 56 are adjustably secured to the rear ends of the plates 58 which are slotted for the purpose. The rear inturned ends 59 of the plates 58 are adjustably secured to the upper transverse plate 60. The above described arrangement is such that the hopper can be adjusted to hold articles of different sizes. A clasp device indicated at 61 holds the hopper in upright position. The device 62 (Fig. 22) permits the tilting forward of the upper end of the hopper for replenishing with articles. The lower edges of the lower side plates 54 are inturned to form the ledges 63 for supporting the pile of articles by engaging the under surface of the outer edges of the lowermost article.

Figure 7:
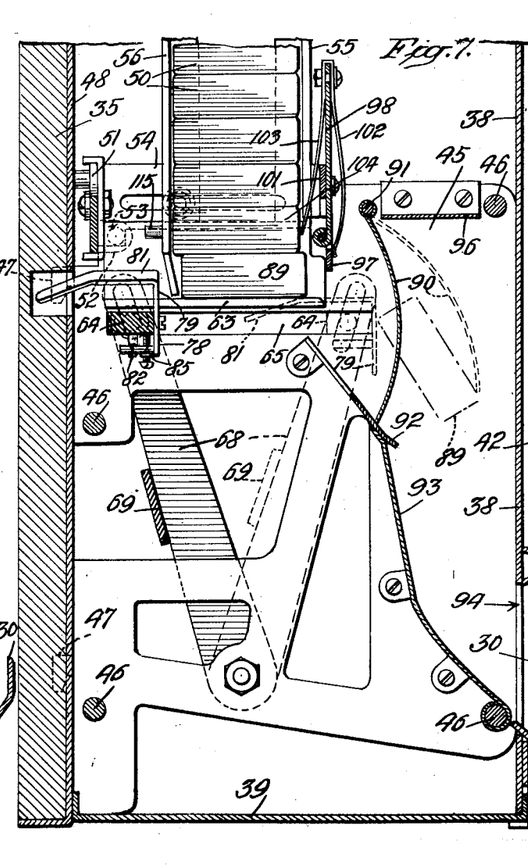

The articles are delivered one by one from the hopper by pushing forwardly on the lowermost article and thus ejecting it from the machine. For this purpose there is provided under each hopper a slide 64 the two ends of which are loosely received in the slots 65 formed in the upper portions of the plates 44 and 45. The outer ends of the slide 64 extend beyond the plates 44 and 45 and each end is provided with a pin 66 loosely received respectively in the slotted upper ends of the arms 67 and 68 pivoted respectively in the lower portions of the walls or plates 44 and 45. In order that the arms may move together they are connected by a cross piece 69. The arms are adapted to be actuated by the coin-controlled mechanism in the manner to be presently described, the arm 67 being provided with the lug 144 which is in the path of forward travel of a part of the coin-controlled mechanism when a properly positioned coin is in the machine. A spring 72 holds the arms normally in retracted position with the slide 64 positioned to the rear of the hopper, as shown in Fig. 7. To prevent return movement of the arms and the slide until after the slide has completed its full forward movement, the arm 67 is provided with an offset part 73 the forward edge 74 of which is toothed to be engaged by the detent 75 controlled by the spring 76.

Figure 18:
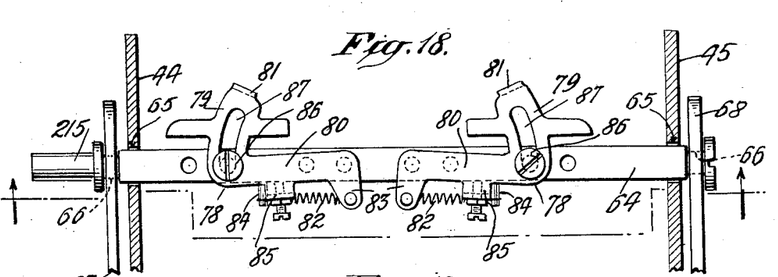
Fig. 18 is a front elevation of the slide and the article engaging fingers of the article delivery means.
Figure 19:
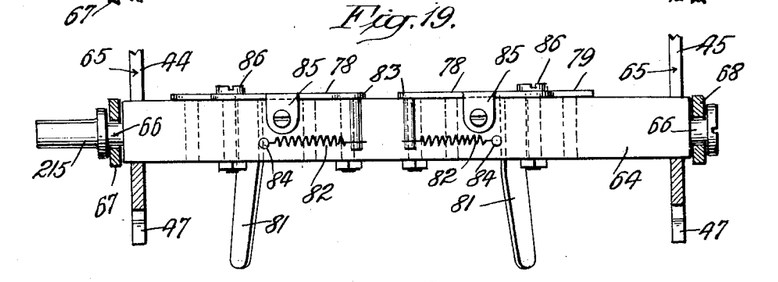
Fig. 19 is a bottom plan of the parts shown in Fig. 18.
Figure 20:
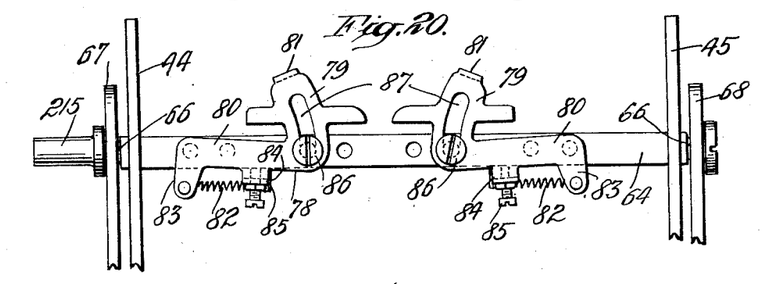
Fig. 20 is a view similar to Fig. 18, but showing the fingers in exchanged, reversed positions.

The article engaging means comprises two spring pressed fingers of peculiar construction mounted on the slide 64. The fingers, indicated generally at 78 (Fig. 18), are alike in mode of operation, but are of reverse construction so that they may be accommodated to relatively long articles or to relatively short articles. When long articles are in the machine the fingers 78 occupy the positions shown in Fig. 18 with the upright portions 79 spaced relatively far apart; and when short articles are in the machine, the fingers occupy the positions shown in Fig. 20 with the upright portions 79 relatively close together. Each finger 78 consists of the upright, curved portion 79 rising from a horizontally disposed portion or arm 80 pivoted at one end on the front of the slide and of a tail portion 81 extending rearwardly from the upper end of the upright portion. A spring 82 fastened at one end to a pin fixed in the part 83 of each finger and to a pin 84 fixed in the slide tends to hold the fingers in elevated, article engaging position. An adjustment device 85 carried by each finger and cooperating with the bottom of the slide is provided to regulate the height of the upright portions 79 of the fingers relatively to the thickness of the articles. The fingers are guided in their movements by the pins 86 fastened in the front of the slide and which are loosely received in the arcuate slots 87 formed in the curved upright portions 79 of the fingers.

Figure 6:
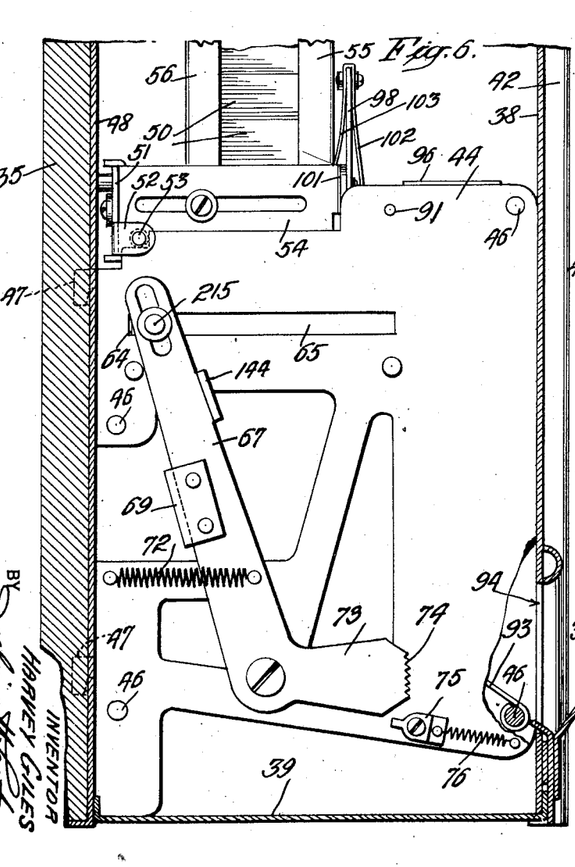
Figs. 6 and 7 are sections taken on the lines 6—6 and 7—7, respectively, of Fig. 3.

Assuming that the parts of the article delivery device are in normal position, that is, their inoperative or retracted position as shown in full lines in Figs. 6 and 7, the upright portions 79 of the fingers will be to the rear of the lowermost article in position to engage and push it forward from under the super-incumbent pile of articles in the hopper on the next forward movement of the slide, which will take place when a proper coin has been deposited in the machine and the handle 31 has been pulled forward. The ejected article is pushed against a flap guard 90 fixed on a rod 91 loosely mounted at its ends in the plates 44 and 45. The lower end of the flap normally rests against the upper off-set part 92 of a chute 93 which directs the article out through the opening 94 cut in the front wall 38 of the casing, the lower part of the chute and the guard 30 forming either receptacle 28 or 29 which holds the article until it is removed by the purchaser. To shut off the articles in the upper part of the hopper from pilfering a guard 96 extends across the upper parts of the front ends of the plates 44 and 45.

Figure 17:
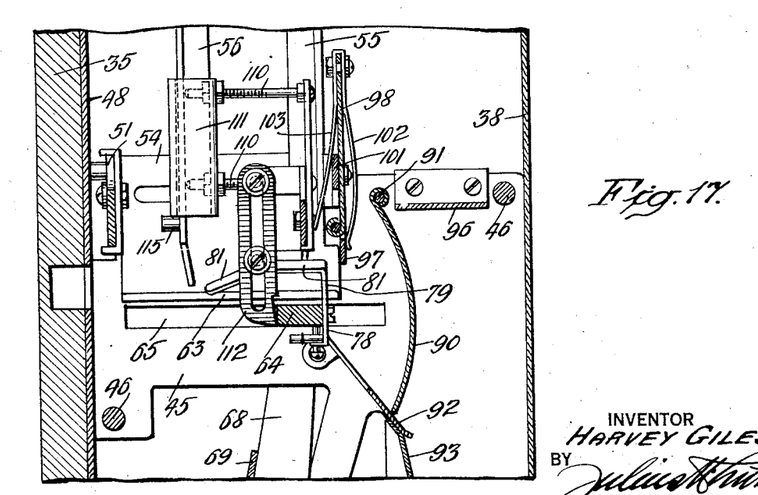

By reference to Figs. 7 and 17 it will be seen the slide 64 is wholly located beneath the inturned article supporting ledges 63 of the hopper and that consequently the ejection of the lowermost article in the hopper is entirely the work of the fingers 78. The article ejecting movement of the slide and fingers is such that the upright portions 79 of the fingers remain in contact with the rear face of the article being ejected until it has been pushed off the forward ends of the ledges, as indicated in Fig. 7. Until the lowermost article is pushed from under the pile of articles in the hoppers the fingers remain raised. Immediately the ejected article passes from beneath the pile, the articles descend onto the tail portions 81 of the fingers and depress them against the action of the springs 82. This arrangement permits the slide 64 to move rearwardly into retracted position, the tail portions of the fingers sliding under and in contact with the now lowermost article. When the slide 64 is again in retracted position with the fingers freed from the article, the springs return the upright portions 79 of the fingers into article engaging position. The lower ends of the uprights 55 and 56 are cut away to permit this mode of operation.

In order that the lowermost article 89 in the hopper may not be shaken out of position a spring pressed flap 97 extends downwardly into the path of travel of the article. The flap 97 is hinged to the lower end of a vertically arranged plate 98 provided with the slots 99 so that it may be adjustably secured to the cross-piece 101, in turn adjustably secured to the lower ends of the front uprights 55. A leaf spring 102 fastened at its upper end to the top of the plate 98 presses inwardly at its lower end against the flap 97. The inner section 103 of the leaf spring 102 presses inwardly at its lower end against the second lowermost article 104 in the hopper. By reason of this arrangement and the adjustability of the hopper, cylindrical as well as rectangular articles may be contained in the hopper and delivered by the slide 64 and its fingers.

An article follower, shown in front elevation in Fig. 24, rests on the uppermost article in the hopper. The article follower comprises a shoe portion 106 adapted to rest directly on the uppermost article. The shoe 106 is offset inwardly from a cross piece 107 adjustably secured at its ends to the arms 108 of the angle pieces 109 through which pass screws 110 carrying on their ends the channel pieces 111 which loosely embrace the rear uprights 56 of the hopper. The heads of the screws 110 bear loosely against the inner walls of the front uprights, and thus the article follower is guided in the hopper. A stop member 112 slotted longitudinally to receive a screw fastened in the shoe 106 and a screw fastened in a bracket 114 extending rearwardly from the cross piece 107 provides means through which the slide is prevented from returning to retracted position after the last article has been delivered. This arrangement is availed of to close the coin slot associated with the exhausted hopper, as will presently appear. So long as the uppermost article remains in the hopper the stop member 112 is held raised, as shown in Fig. 21, but when this article has been delivered, the stop member 112 drops and occupies the path of travel of the return movement of the slide as shown in Fig. 17, thereby holding the slide and the parts connected with it until the attendant removes the article follower preparatory to replenishing the hopper. The frame of the article follower is prevented from descending below the requisite point by the stop pins 115 projecting rearwardly from the rear uprights 56 into the path of downward travel of the channel pieces 111.

The coin-controlled mechanism for operating the article delivery means comprises a plunger 117 on the outer end of which is formed the handle 31. The plunger 117 is as long as the casing is deep at its lower part, as clearly shown in Fig. 5. The plunger is supported for forward and backward sliding movements between two upright plates 118 and 119 which serve to support all the parts of the coin-controlled mechanism. These plates are held spaced apart by the pins 120 appropriately positioned at various points where they will not interfere with the operating parts of the mechanism. The plates 118 and 119 also are substantially as wide as the lower part of the casing is deep, and the plates are held in position in the casing by the hooks 121 projecting rearwardly from the plates and engaging with portions of the plate 48 through holes therein. A latch 122 pivoted in the plate 48 engages in a slot in the upper edges of the plates 118 and 119 and so holds them against accidental upward movement. The plates 118 and 119 are both alike in shape and are pierced at various points to accommodate operating parts projecting therethrough.

Figure 5:
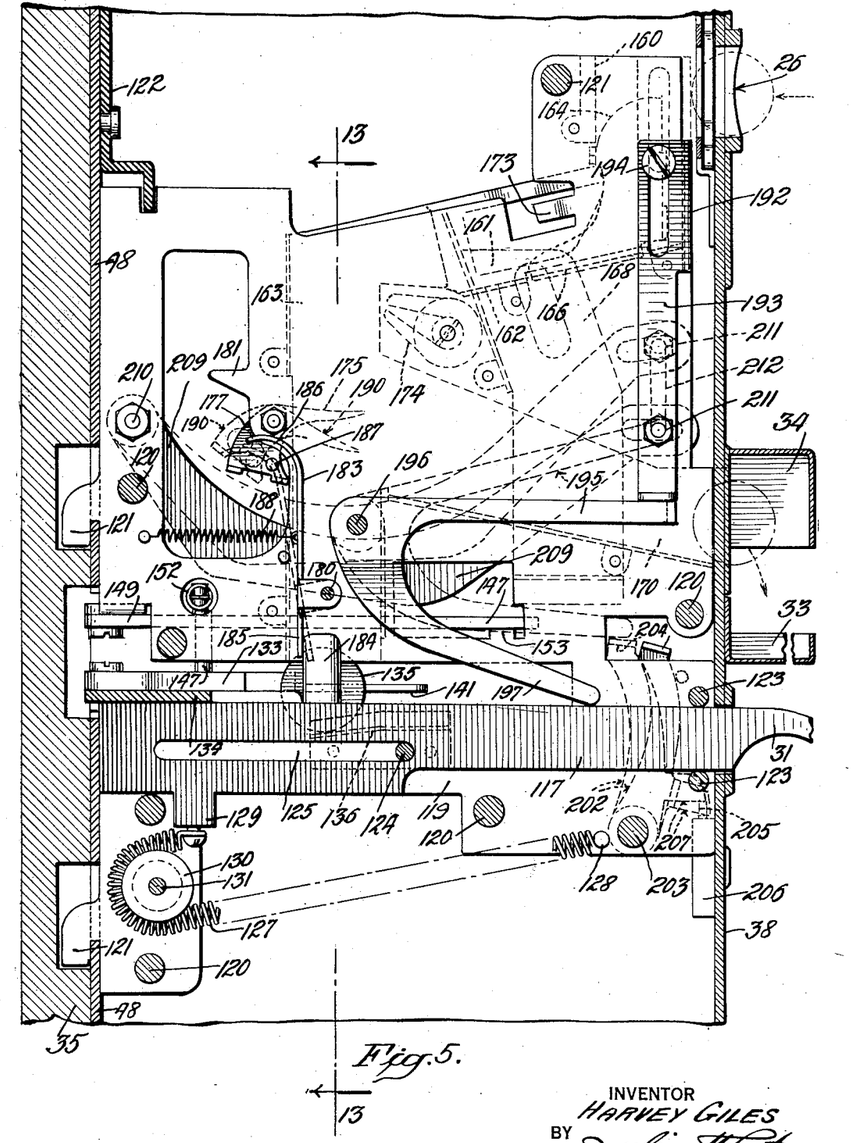
Fig. 5 is a section taken on the line 5—5 of Fig. 3, and showing the parts in enlarged side elevation.

The plunger 117 is supported at its forward end by the pins 123 and at its rear end by the pin 124 which projects through a longitudinal slot 125 in the plunger. The rear end of the slot by engagement with the pin 124 limits the forward movement of the plunger. The plunger is pulled forwardly by the purchaser after he deposits his coin in the machine, and the plunger is returned to its retracted or normal position, as shown in Fig. 5, by means of a long coiled spring 127 fastened at its forward end to a fixed pin 128 and at its rear end to the lug 129 of the plunger. At its rear end the spring passes downwardly around a wheel 130 mounted on a pin 131.

The plunger 117 and the plates 118 and 119 carry a duplicate set of coin-controlled mechanisms for operating the article delivery means. Since the duplicate parts are exactly alike and have the same mode of operation no confusion will arise in describing in detail only the parts for actuating the right hand article delivery means, although the operating parts of the coin-controlled mechanisms are in large part mounted on opposite sides of the plates 118 and 119 and the same reference numerals will be used to designate corresponding parts. Where both mechanisms employ the same element, as the plunger 117, this fact will be clearly indicated.

Figure 1:
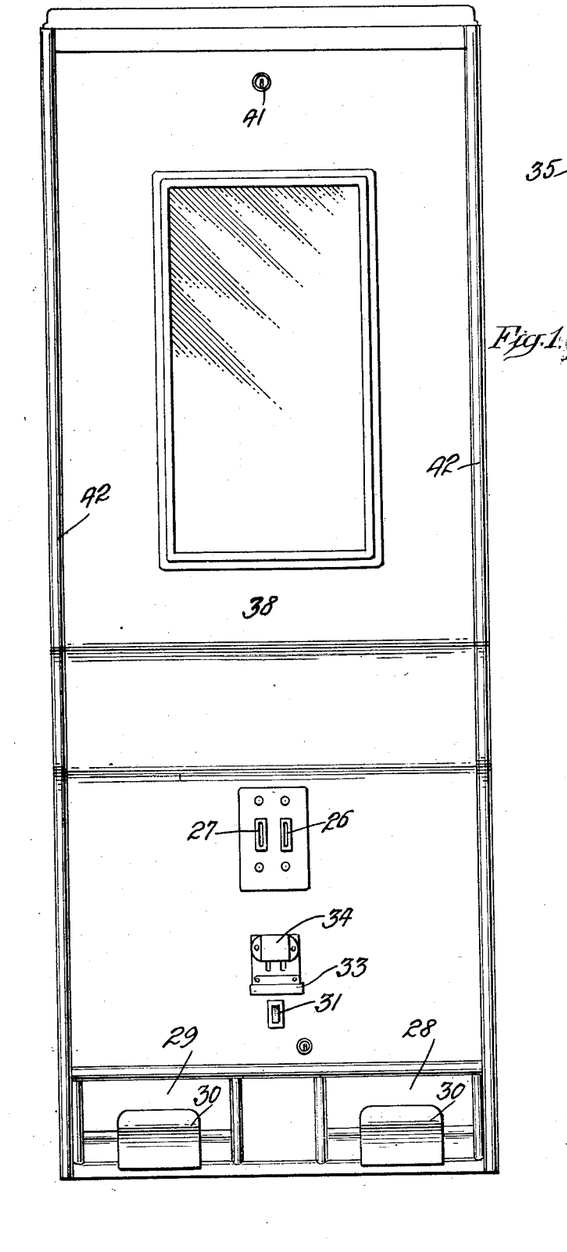
Fig. 1 is a front elevation on a reduced scale of the complete vending machine.
Figure 2:
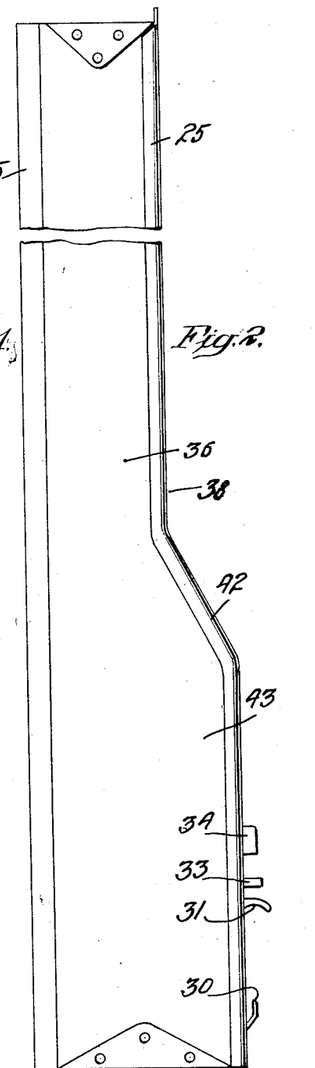
Fig. 2 is a side elevation of the machine.
Figure 3:
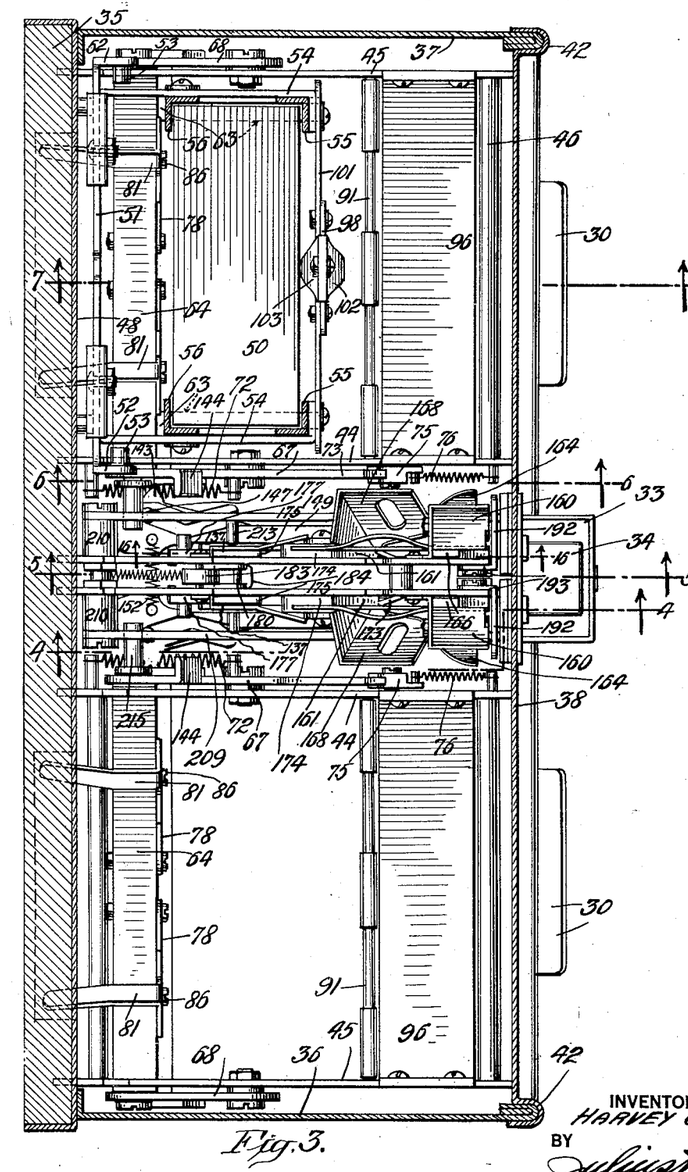
Fig. 3 is a transverse section through the machine and showing the operating parts in top plan, the article containing hopper and its connected parts being removed from one half of the machine and other parts being removed to show the remaining parts more clearly.
Figure 4:
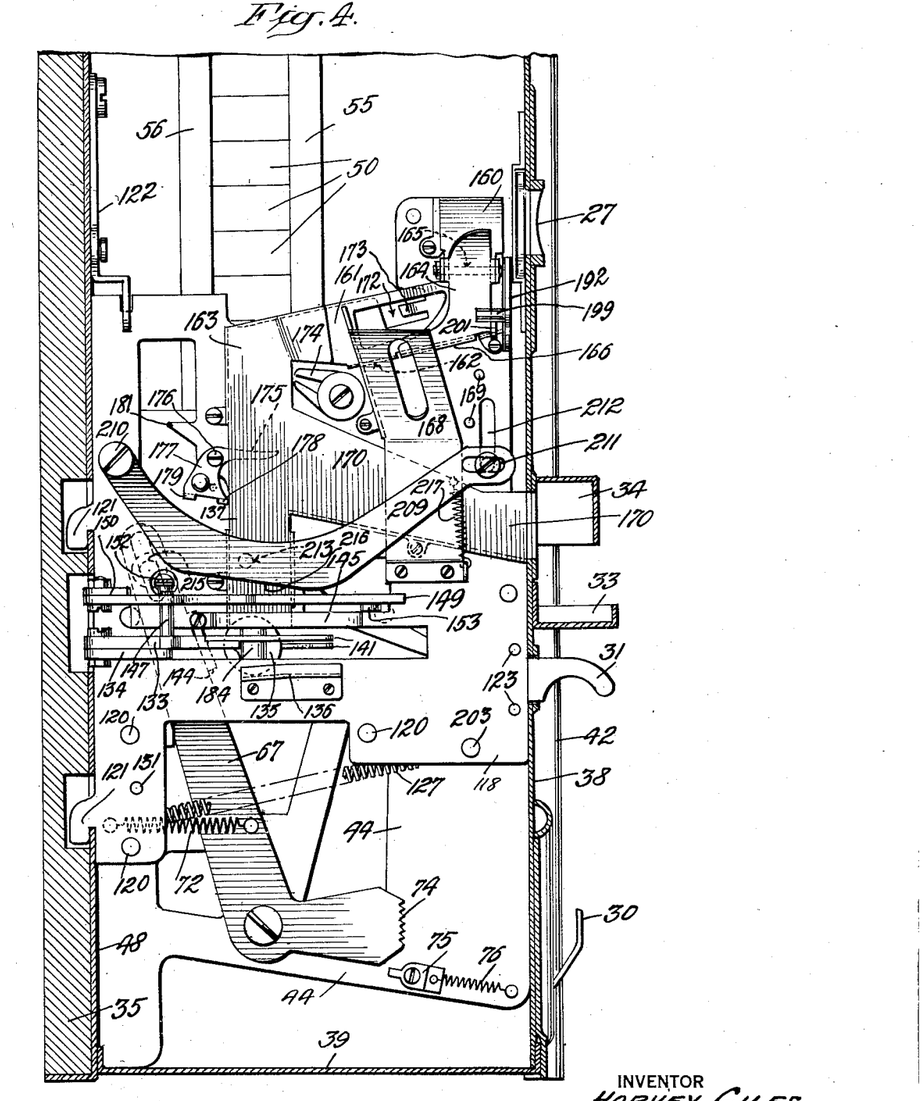
Fig. 4 is a section taken on the line 4—4 of Fig. 3, and showing the coin-controlled mechanism in side elevation.

Each coin-controlled mechanism comprises a coin-engaging arm 133 pivoted at its rear end on a horizontal plate 134 supported on the extreme rear end of the plunger and extending laterally therefrom. The free end of the arm 133 extends forwardly into position to engage with a properly positioned coin 135. As shown in Figs 4 and 5 the coin 135 rests on a flanged support 136 which forms the bottom of a vertically arranged coin pocket indicated at 137 in Fig. 4. The sides of the lower part of the coin pocket adjacent to the coin-engaging forward end of each arm 133 is cut away to permit the arms 133 to engage the coins and also to permit them to eject the coins from the pockets so that they will fall into the bottom of the casing. The rear end of the floor of the coin support 136 tilts backwardly to assure that the coin will remain in position to be engaged by its respective arm 133. The relative positions of a coin and of an arm 133 when the coin is first deposited in the machine and before the plunger 117 is moved are shown in plan in full lines in Fig. 11. It will be seen that the coin 135 extends rearwardly into a recess in the arm formed by the coin-engaging part 139 and the shoulder or coin-ejecting part 140. Extending forwardly from the forward end of each arm 133 is a finger-like part 141 which aids in keeping the coin in position to be engaged by the coin-engaging part 139 of the arm on the forward movement of the plunger.

As the arm 133 moves forward with the plunger the arm is turned inwardly to bring the part 139 thereof into contact with the side of the coin. The contact between the arm and the coin prevents further turning of the arm while it is being moved forwardly by the plunger. During this unturning or straight forward movement of the arm 133 while in engagement with a coin, a lug 143 on the arm engages with a lug 144 on the arm 67 and carries it forward (Fig. 9), thereby oscillating the arms 67 and 68 and passing the slide 64 under the hopper to deliver the lowermost article therein from the machine. As the arm 133 moves forward, the shoulder 140 pushes the coin forwardly beyond the pocket 137 and then beyond the forward edge of the coin support 136. During this travel of the coin its upper edge is supported laterally by a light leaf spring 145 fixed at its rear end and loose at its forward end. By the time the plunger has reached the limit of its forward movement the article has been ejected and the arm 133 has moved the coin beyond the support 136, whereupon the coin falls to the bottom of the casing.

The means for turning the arm 133 comprises a pin 147 rising from the arm and received loosely in a cam slot 148 cut in a plate 149 located above the arm 133 and pivotally supported from a bracket 150 projecting outwardly from the rear margin of the plate 119. By reference to Fig. 4 it will be seen that when the plunger is in normal position the pivot points of the arm 133 and of the cam plate 149 are in line vertically. The two cam plates 149 are pulled toward each other and held yieldingly against their respective upright plates 118 and 119 by means of a spring 152 connected to the two plates 149. The free ends of the cam plates 149 extend forwardly and are supported on the brackets 153. At their inner edges the cam plates are cut away to clear the coin pockets 137. At their forward ends the cam plates are inturned at the point where they rest on the brackets 153, and these inturned ends act as stops and engage with the plates 118 and 119.

Figure 8:
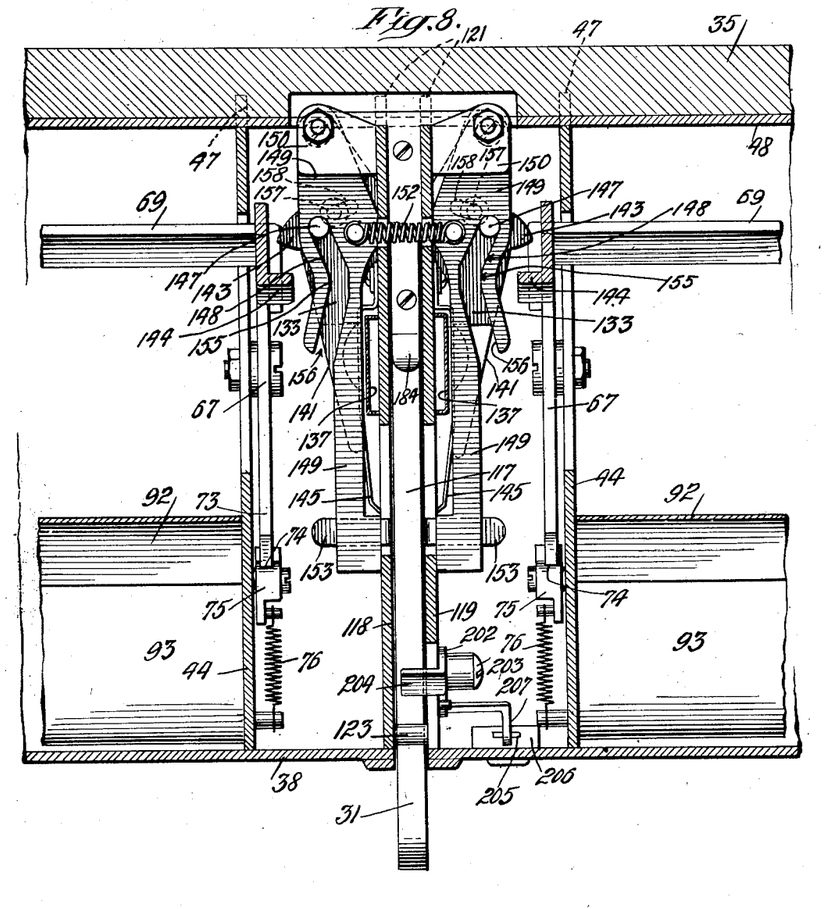
Fig. 8 is a section taken on the line 8—8 of Fig. 14, and showing in top plan the principal parts of the coin-controlled mechanism for actuating the article delivery devices, the plunger and its connected parts being shown in normal, retracted position.
Figure 10:
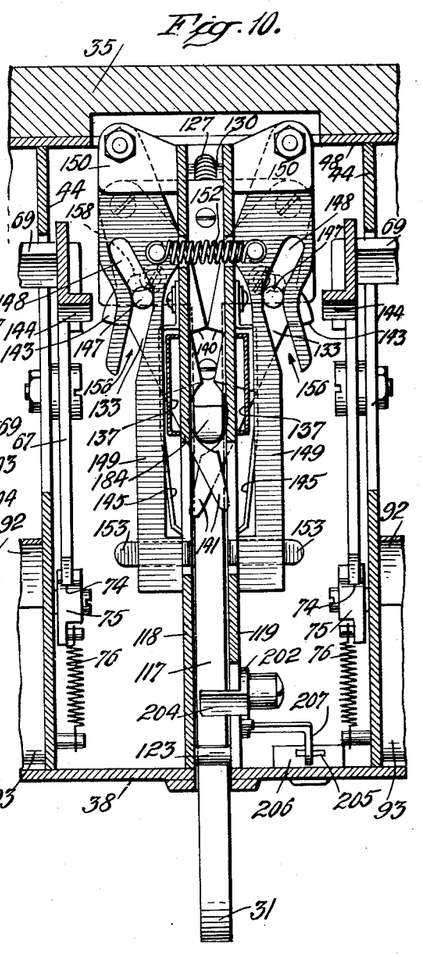

While the parts of the coin-controlled mechanisms and of the article delivery means are in normal, retracted position, as shown in Fig. 8, the lugs 143 on the arms 133 are positioned behind the lugs 144 on the arms 67 and spaced therefrom, and the pins 147 occupy the rear ends of the cam slots 148. The cam slots are directed inwardly and their bottom or inner ends 155 are located substantially opposite the lugs 144. By reason of this arrangement, the cam slots deflect the pins 147 and their arms 133 inwardly so that the lugs 143 clear the lugs 144 when the plunger is moved forwardly when no coin is in the machine, as clearly indicated in Fig. 10. While the pins 147 are in the inner ends of the cam slots 148, the forward ends of the extensions 141 cross each other, and to permit this action they are secured to their respective arms 133 on different planes, as seen in Fig. 4. After passing the inner ends 155 of the cam slots the pins 147 are directed outwardly by the cam slots 156 which are a forward continuation of the cam slots 148, except that they are arranged in reversed position. After emerging from the open forward ends of the cam slots the pins 147 travel forwardly in engagement with the outer edges of the forward ends of the cam plates 149, being prevented from outward movement by the pins 157 extending downwardly from the arms 133 into the slots 158 formed in the plate 134. On the rearward movement of the plunger under action of the spring 127 the pins 147 reenter the cam slots and the arms 133 are returned to normal retracted position.

Figure 9:
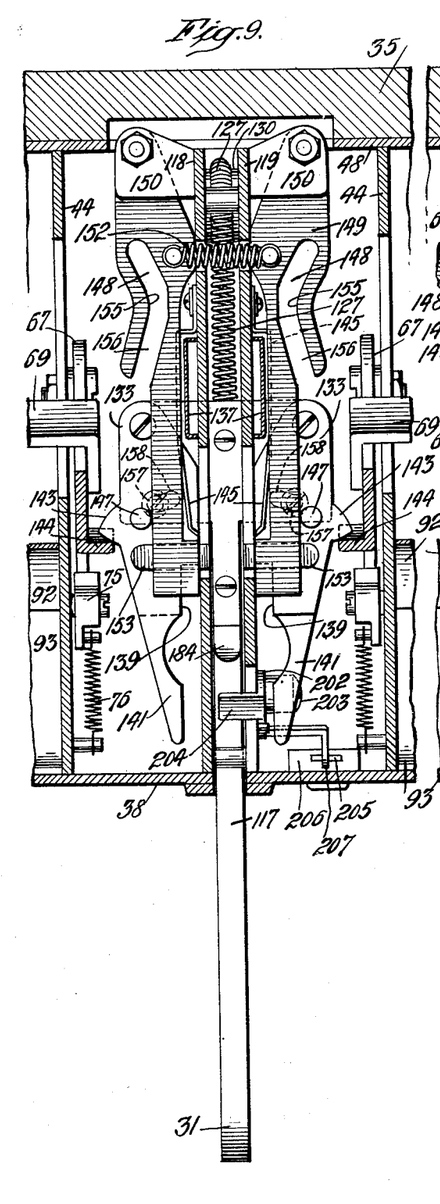
Figs. 9 and 10 are views similar to Fig. 8, but showing the parts in different positions of operation.
Figure 11:
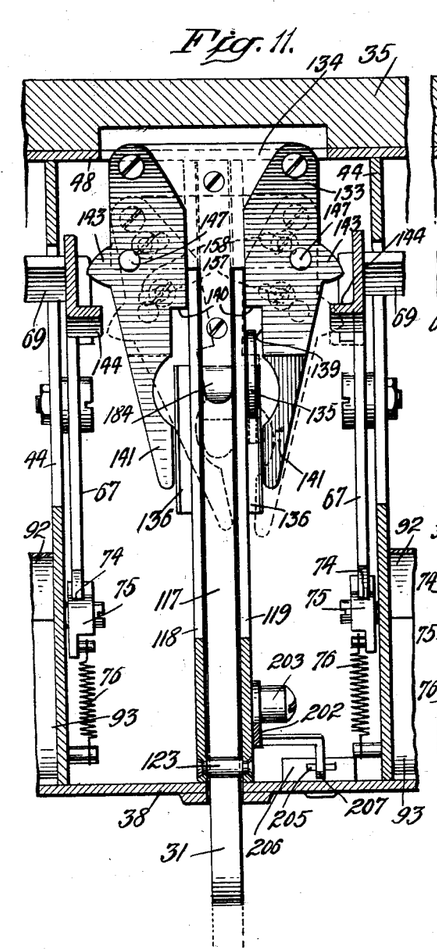
Fig. 11 is a section taken on the line 11—11 of Fig. 14, and showing the parts in the position of Fig. 8.
Figure 12:
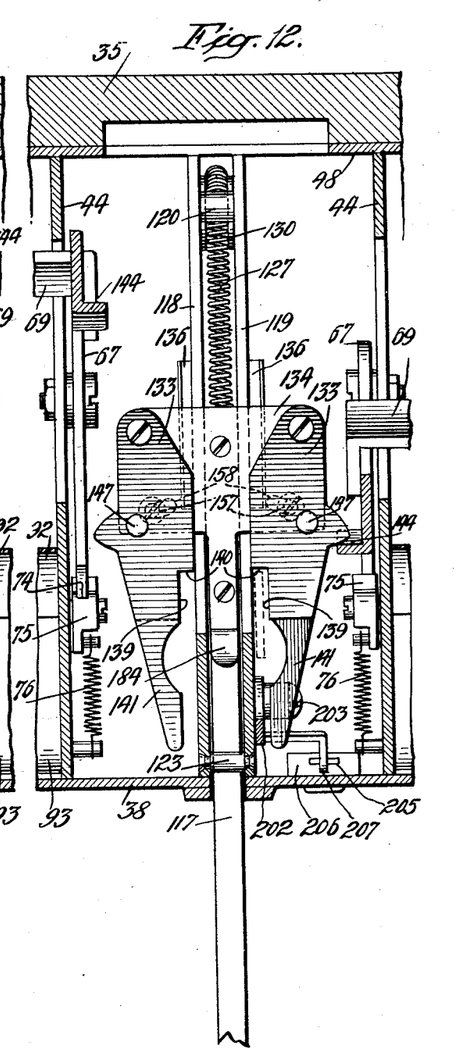
Fig. 12 is a view similar to Fig. 11, but showing the parts in different positions of operation.

When a coin is in position to be engaged by an arm 133, the initial movement of the plunger causes the cam slot 148 to deflect the arm 133 into contact with the coin, as shown by the dotted lines in Fig. 11. Thereupon the forward movement of the pin 147 in a straight line (the coin preventing the arm 133 from turning) causes the cam plate to be swung outwardly, thereby permitting the engagement of the lug 144 by the lug 143 and the actuation of the article delivery means. If only one coin is in the machine, the arm 133 on the side where the coin is absent will move forward inoperatively, as shown in Fig. 12. If two coins are in the machine at the same time, the manipulation of the plunger causes both arms 133 to engage both lugs 144 and actuate both article delivery means simultaneously, as indicated in Fig. 9. When the pins 147 pass forward beyond the inner ends 155 of the cam slots 148 and into the cam slots 156, the spring 152 returns the cam plates 149 to normal position, with the inturned forward ends thereof pressing against the plates 118 and 119. The same mode of operation occurs with respect to a single cam plate moved outwardly while the other remains in normal position during the absence of a coin on its side of the machine. The lugs 144 on their backward movement follow the lugs 143 until the pins 147 associated with the latter enter the cam slots 156.

The means for directing a coin into either pocket 137 comprises a coin passage constructed and arranged in the following manner: Each coin slot 26 and 27 opens into a hopper shaped receptacle 160 which forms the mouth of a coin passage 161 having a slanting bottom 162 which directs the coins into the upper end 163 of the pocket 137. Each pocket 137 is formed on its inner side by one of the plates 118 and 119 and on its outer side by a sheet of thin metal having inturned edges abutting the plates 118 and 119. The bottom of the hopper shaped receptacle 160 is formed by the inturned lower edge 166 of an arm 164 pivoted at 165. The edge 166 thus forms a movable section of the coin passage, and the arm 164 is arranged to be moved, each time the plunger is pulled forward, to release paper slugs or the like which stop on the section 166. The released material drops into a chute 168 open at its front side except for the pins 169. The lower end of the chute opens into a returned coil passage 170 leading from the middle of the pocket 137 into the hood 34 under which is located the returned coin receptacle 33. Under size coins pass into the chute 168 through the opening 172 in the beginning of the coin passage, being deflected therethrough by the out-turned lug 173. At the entrance of the pocket is located a magnet 174 the upper surface of which forms part of the coin passage so that the coins roll over it on their way into the pocket 137. An iron slug inserted into the machine will cling to the magnet until it reaches the under side thereof, and then it will drop into the passage 170 and be discharged into the receptacle 33.

As a coin which succeeds in passing the obstacles in the coin passage drops down into the pocket 137 it encounters the horizontally arranged arm 175 of a coin detector pivoted at 176 and provided with a weighted tail portion 177. A stop 178 on the tail portion by engagement with the rear side of the pocket 137 holds the coin detector so that the arm 175 is substantially horizontally disposed in the path of the falling coins. If a coin is of the proper size and weight it will tilt the coin detector, pushing the arm 175 downward, and pass into the bottom of the pocket in position to be engaged by one of the arms 133. A second stop 179 on the tail of the coin detector by engagement with the lug 181 limits the turning movement of the coin detector under the action of the falling coin. If the coin is large enough to roll down the coin passage 161 but is too light to tilt the coin detector, the arm 175 will deflect it, directing it into the returned coin passage 170.

It sometimes happens during the operation of vending machines of this character that pieces of paper or other material from the articles to be vended will accumulate behind the rear end of the plunger and prevent it from assuming its normal retracted position. The plunger may be held in such advanced position that the lugs 143 will fail to engage the lugs 144 when a proper coin is inserted in the machine and the plunger pulled forward. To return the coin to the prospective purchaser under such conditions, I provide a single guard member 183 located between the plates 118 and 119 and pivoted thereon at 180. The member 183 has a normal vertical position, being held in that position by means of the lug 184 on the plunger 117 which engages the lower end 185 of the member 183 when the plunger is in retracted position, as shown in Fig. 5. In this position of the member 183 the upper, rearwardly curved end 186 thereof is held clear of the pins 187 projecting inwardly from the tail portions of the two coin detectors, thereby permitting the coin detectors to function normally, allowing proper coins to fall to the bottom of the pockets 137 and directing improper coins into the passages 170. If now the plunger is prevented from returning into its normal retracted position, the lug 184 does not engage with the lower end of the member 183 and consequently the spring 188 will turn the member on its pivot and pull the upper curved end of the member against the pins 187 and hold the coin detectors in the position indicated by the dotted lines 190 in Fig. 5. In this position of the coin detectors all coins falling down into the pockets 137 will be deflected into the passages 170.

Figures 13, 14, 15:
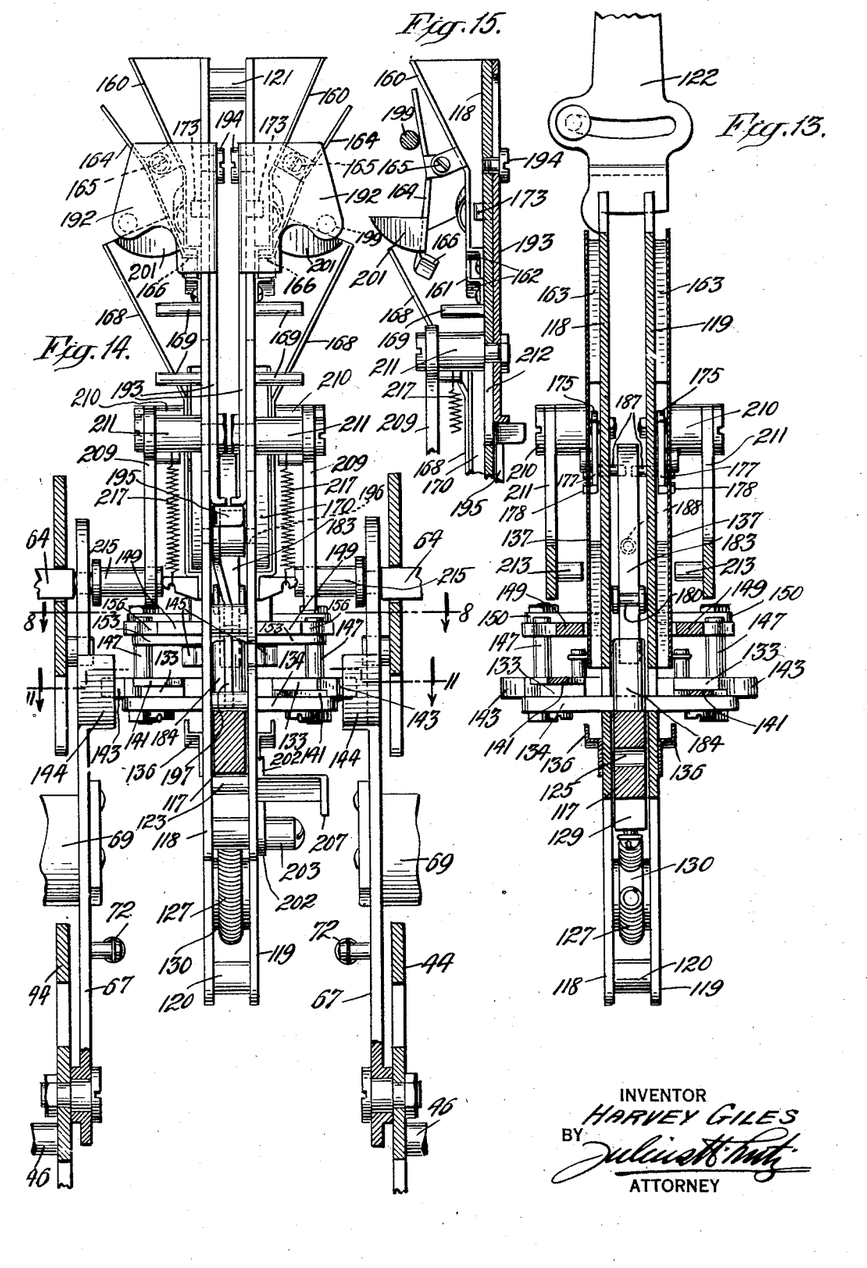
Fig. 13 is a vertical section taken on the line 13—13 of Fig. 5.
Fig. 14 is a front elevation of the coin-controlled mechanism for actuating the article delivery means, and showing adjacent parts of the latter, certain portions being shown in section to make the construction clearer.
Fig. 15 is a longitudinal detail section of the upper end of Fig. 14, and showing the movable track section in releasing position.
Figure 16:
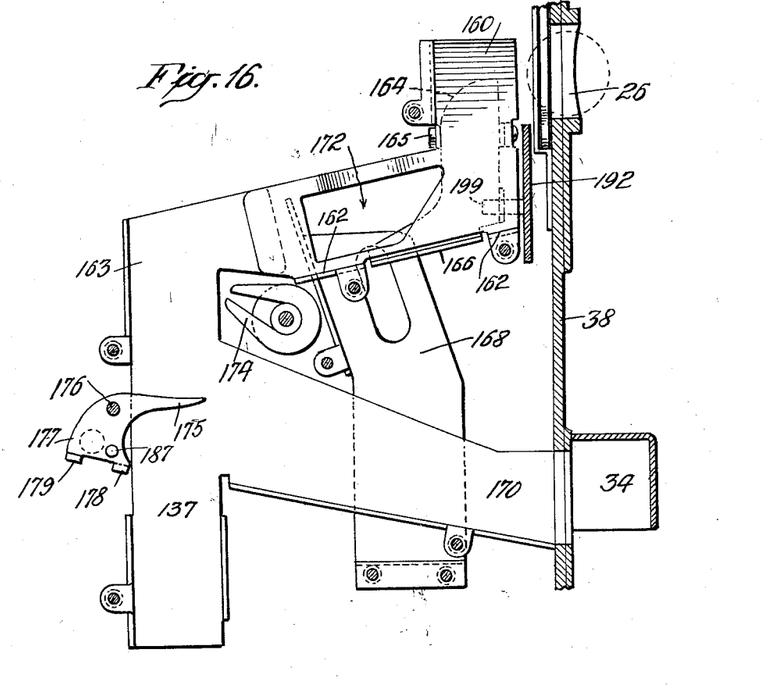
Fig. 16 is a section taken on the line 16—16 of Fig. 3.

Each coin receiving slot 26 and 27 and the coin passage with which it communicates is provided with a shutter or guard 192 arranged to shut off the coin passages from the coin slots 26 and 27 each time the plunger is pulled forward. Each shutter or guard 192 is in the form of a plate (seen in front elevation in Fig. 14) which carries on its inner vertical edge an inturned elongated flange 193 arranged to slide vertically and held against its respective plate 118 or 119 by a large-headed screw 194, the upper end of each flange 193 being slotted to receive loosely the neck of the screw. The lower end of the downwardly extending part of each flange 193 is inturned and these inturned ends both rest on the forward end of the arm 195 of a two-armed lever pivoted at 196 between the two plates 118 and 119. The forward end of the other arm 197 of the lever normally rests on the upper surface of the forward end of the plunger. Under these conditions the shutters 192 are positioned below the coin slots 26 and 27 and coins may be inserted into the machine. If now the plunger is pulled outwardly, whether a coin has been inserted into the machine or not, the lug 184 encounters and lifts the arm 197, thereby turning the lever on its pivot 196 and lifting the outer end of the arm 195 to raise the flanges 193 and place the shutters 192 in front of the receptacles 160, thereby shutting off the coin passages from the slots 26 and 27. As each shutter 192 rises, a pin 199 projecting rearwardly from it encounters the upper part of the movable coin passage section or arm 164 and tilts it, thereby swinging the inturned lower end 166 thereof outwardly to release any material resting on the edge 166, as indicated in Fig. 15. On the return downward movement of the shutters the pins 199 meet the lugs 201 extending laterally from the lower ends of the arms 164 and restore the arms to normal position with the edges 166 forming part of the bottoms of the coin passages.

If the vending machine is employed in connection with a store or other place of sale where the proprietor or clerk is usually in attendance and it is desired to lock the machine when the proprietor or clerk is absent, I provide a dog 202 pivoted at 203 in the plate 119 and having an off-set upper end 204 projecting through a hole in the plate 119 and into position to be moved under the forward end of the arm 197, when the latter is raised, to hold the shutters in front of the coin passages. The means for swinging the dog under the arm 197 and holding it there is the bolt 205 of a lock 206 which engages the lug 207 extending laterally from the dog 202.

When all the articles have been delivered from either hopper the coin passage associated with the empty hopper is closed by holding its shutter 192 in raised position. For this purpose there is mounted on the outer side of each plate 118 and 119 and spaced apart therefrom a lever arm 209. Each lever arm 209 is pivoted at 210 on the rear margin of its respective plate and extends forwardly into position to engage by its slotted forward end a bolt 211 projecting laterally from the lower part of the flange 193 of the shutter mounted on the same plate. The forward edge of each plate 118 and 119 is slotted vertically at 212 to accommodate the vertical movements of its respective bolt 211. At the point of each arm 209 opposite the outer side of the adjacent pocket 137 there is an inwardly projecting pin 213 to prevent the arms 209 from swinging inwardly and interfering with the operation of other parts.

Each arm 209 is actuated to lift the shutter 192 connected with its forward end each time the arm 67 of the adjacent article delivery means is moved forward. On the end of the slide 64 connected with each arm 67 there is mounted a knob 215 adapted to pass under and in contact with the obliquely arranged lower edge 216 of the adjacent arm 209 and swing the arm on its pivot, thereby raising its forward end. The return movement of the arms 67 frees the knobs 215 from the surfaces 216 and permits the forward ends of the arms 209 to descend. The proper descent of the forward ends of the arms 209 is assured by providing each one with a downwardly acting spring 217. As explained above, when the slide 64 and its fingers are pushing the last article forward out of the hopper the member 112 drops down into the path of return movement of the slide and holds it. This occurs while the knob 215 is still under the surface 216 and consequently the shutter 192 corresponding to the empty hopper is held behind its coin slot 26 or 27 closing the coin passage into which it leads. When the other hopper is empty the same action occurs. The arms 67 are freed by the attendant lifting the article followers preparatory to refilling the hopper.

Having thus described the invention, what I claim as new is:

1. In combination with a vending machine having an article delivery means, a coin-controlled mechanism comprising a slidingly mounted plunger adapted to be manipulated, a coin-engaging arm pivotally mounted on the plunger and having a part adapted to engage and actuate the article delivery means, a pin fixed on the arm, a pivotally and yieldingly mounted plate having a cam slot into which the pin projects, movement of the plunger when the arm does not engage with a properly positioned coin causing the pin to be deflected by the cam slot whereby the arm is caused to move past the article delivery means without engaging it.

2. In combination with a vending machine having an article delivery means, a coin-controlled mechanism comprising, a slidingly mounted plunger adapted to be manipulated, a coin-engaging arm pivotally mounted on the plunger and having a part adapted to engage and actuate the article delivery means, a pin fixed on the arm, a movably mounted plate having a cam slot into which the pin projects, movement of the plunger when the arm does not engage with a properly positioned coin causing the pin to be deflected by the cam slot whereby the arm is caused to move past the article delivery means without engaging it.

3. In combination with a vending machine having article delivery means, a coin-controlled mechanism comprising, a slidingly mounted plunger adapted to be manipulated, a coin-engaging arm movably mounted on the plunger and having a part adapted to engage and actuate the article delivery means, a plate yieldingly mounted on a fixed part of the mechanism and having a cam surface, an arm having a part adapted to contact with the cam surface, the cam surface serving to deflect the arm on movement of the plunger when the arm does not engage with a coin, the engagement of the arm with a coin holding the arm against deflection by the cam surface and causing the plate to move so that on movement of the plunger the arm engages with and actuates the article delivery means.

4. In combination with a vending machine having article delivery means, a coin-controlled mechanism comprising, an upright plate, a plunger slidingly mounted on the plate and adapted to be manipulated, a coin-engaging arm pivotally mounted on the plate and having a part adapted to engage and actuate the article delivery means, a pin projecting upwardly from the arm, a cam plate pivotally mounted on the upright plate and having a cam slot in which the upper end of the pin is received, means for yieldingly holding the cam plate in normal position, movement of the plunger when the arm does not engage with a coin causing the cam slot to deflect the arm out of engagement with the article delivery means, but engagement of a coin by the arm when the plunger is manipulated causing the pin to move the cam plate so that the arm engages with and actuates the article delivery means.

5. In combination with a vending machine having two article delivery means spaced apart, a coin-controlled mechanism located between the two article delivery means and comprising, a slidingly mounted plunger adapted to be manipulated, two coin-engaging arms pivotally mounted on the plunger, one on one side and one on the other, each arm having a part adapted to engage and actuate the adjacent article delivery means, a pin projecting upwardly from each arm, a pivotally mounted cam plate located over each arm and having a cam slot into which the pin of the plate under it projects, a spring connecting the two cam plates and drawing them toward each other, movement of the plunger when neither arm engages a coin causing the arms to be deflected by the cam slots out of engagement with the article delivery means, and movement of the plunger when either or both arms engage with properly positioned coins causing the arms to move the cam plates outwardly, whereby the arms engage with and actuate the article delivery means.

6. In combination with a vending machine having article delivery means, a coin-controlled mechanism comprising, a plunger mounted to slide forward and backward in the machine and adapted to be manipulated, an arm pivotally mounted on the rear end of the plunger, the free end of the arm extending forwardly and having a part adapted to engage and actuate the article delivery means, the free end of the arm being adapted to engage with a properly positioned coin to hold the arm in position to engage with the article delivery means on the forward movement of the plunger, a yieldingly mounted cam plate located over the arm and having a cam surface, the arm having a part engaged by the cam surface to hold the arm from engagement with the article delivery means when the plunger is moved forward and the arm does not engage with a coin.

7. In combination with a vending machine having two article delivery means spaced apart, a coin-controlled mechanism located between the two article delivery means and comprising two upright plates, a plunger slidingly mounted between the plates to move forward and backward and arranged to be manipulated, two arms pivotally mounted on the rear end of the plate and extending forwardly thereof, the free ends of the arms being adapted to engage with properly positioned coins, each arm having means for engaging and actuating the adjacent article delivery means, a cam plate pivotally mounted over each arm and extending forwardly, each cam plate being provided with a cam slot, a pin rising from each arm adapted to travel in the cam slot above it, means for yieldingly holding the cam plates toward each other, the forward movement of the plunger when the arms do not engage with coins causing the cam slots to move the arms inwardly so that they do not engage with the article delivery means, and forward movement of the plunger when either or both arms engage with coins causing one or both pins to move one or both cam plates outwardly so that one or both arms engage with and actuate one or both article delivery means.

HARVEY GILES.